United States Patent
Berger et al.

(10) Patent No.: US 12,065,940 B2
(45) Date of Patent: Aug. 20, 2024

(54) EXHAUST GAS TURBOCHARGER HAVING A HYDRODYNAMIC PLAIN BEARING OR A HYDRODYNAMIC PLAIN BEARING

(71) Applicants: BMTS Technology GmbH & Co. KG, Stuttgart (DE); Martin Berger, Oberderdingen (DE)

(72) Inventors: Martin Berger, Oberderdingen (DE); Rüdiger Kleinschmidt, Besigheim (DE); Frieder Stetter, Stuttgart (DE); Oliver Kuhne, Stuttgart (DE); Steffen Schmitt, Ditzingen (DE)

(73) Assignee: BMTS Technology GmbH & Co. KG (DE)

( * ) Notice: Subject to any disclaimer, the term of this patent is extended or adjusted under 35 U.S.C. 154(b) by 357 days.

(21) Appl. No.: 17/298,342

(22) PCT Filed: Nov. 22, 2019

(86) PCT No.: PCT/EP2019/082253
§ 371 (c)(1),
(2) Date: May 28, 2021

(87) PCT Pub. No.: WO2020/114803
PCT Pub. Date: Jun. 11, 2020

(65) Prior Publication Data
US 2022/0120193 A1 Apr. 21, 2022

(30) Foreign Application Priority Data

Dec. 3, 2018 (DE) ...................... 10 2018 130 706.3
Dec. 20, 2018 (DE) ...................... 10 2018 133 129.0

(51) Int. Cl.
*F01D 25/16* (2006.01)
*F02C 6/12* (2006.01)
(Continued)

(52) U.S. Cl.
CPC .............. *F01D 25/166* (2013.01); *F02C 6/12* (2013.01); *F02C 7/06* (2013.01); *F16C 17/105* (2013.01);
(Continued)

(58) Field of Classification Search
CPC .. F16C 17/105; F16C 17/107; F16C 2360/24; F01D 25/166; F01D 25/168; F02C 6/12; F02C 7/06; F05D 2220/40; F05D 2240/53
See application file for complete search history.

(56) References Cited

U.S. PATENT DOCUMENTS 5,518,319 A 5/1996 Selby
5,789,839 A * 8/1998 Langenbeck ......... F16C 33/107
310/90

(Continued)

FOREIGN PATENT DOCUMENTS

DE 850093 C 9/1952
DE 102008059598 A1 6/2010
(Continued)

OTHER PUBLICATIONS

Co-pending U.S. Appl. No. 17/298,309, filed May 28, 2021 (not prior art).
(Continued)

*Primary Examiner* — Alan B Waits
(74) *Attorney, Agent, or Firm* — Lucian Wayne Beavers; Patterson Intellectual Property Law, PC

(57) ABSTRACT

The invention relates to an exhaust gas turbocharger having a hydrodynamic plain bearing or a hydrodynamic plain bearing, comprising a rotor (10) and a counter-bearing part (50) assigned to the rotor (10), wherein a rotor bearing surface of the rotor (10) and a counterface of the counter-bearing part (50) face each other to form the hydrodynamic (Continued)

plain bearing in the form of a combined journal—thrust bearing, having a continuous hydrodynamically load bearing gap formed between the rotor bearing surface and the counterface, wherein the rotor bearing surface and/or the counterface, when cut longitudinally and through the axis of rotation (R) in sectional view, form(s) a bearing contour forming merging contour sections (17.1 to 17.3; 44.1 to 44.3; 53.1 to 53.3) to generate hydrodynamic load capacities in both the radial and the axial direction, wherein a contour section (17.3; 44.3; 53.3) in sectional view in a first bearing area forms a linear section that is part of a, in particular cylindrical or partially cylindrical, bearing section rotating at least sectionally about the axis of rotation (R), wherein a further contour section (17.1; 44.1; 53.1), in sectional view in a second bearing area, forms a further linear section, which is part of a further bearing area rotating at least sectionally about the axis of rotation (R), wherein this further linear section forms an angle with the axis of rotation (R), and wherein the first and the second bearing area merge via a transition section. According to the invention, a friction-optimized bearing system is to be created, which is easy to manufacture and ensures a reliable and effective bearing arrangement even under highly dynamic loads. According to the invention, this is achieved by the further linear section forming an angle in the range from >30° to <90° with the axis of rotation (R).

28 Claims, 8 Drawing Sheets

(51) Int. Cl.
  *F02C 7/06* (2006.01)
  *F16C 17/10* (2006.01)
(52) U.S. Cl.
  CPC ........ *F16C 17/107* (2013.01); *F05D 2220/40* (2013.01); *F05D 2240/53* (2013.01); *F16C 2360/24* (2013.01)

(56) References Cited

U.S. PATENT DOCUMENTS

| | | |
|---|---|---|
| 9,790,812 B2 | 10/2017 | Ryu |
| 10,393,169 B2 | 8/2019 | Berger |
| 10,424,992 B2 | 9/2019 | Bruckhoff et al. |
| 10,670,071 B2 | 6/2020 | Berger |
| 2008/0232729 A1 | 9/2008 | Petitjean et al. |
| 2015/0093233 A1 | 4/2015 | Daguin et al. |
| 2015/0118044 A1 | 4/2015 | Hippen et al. |
| 2017/0159708 A1* | 6/2017 | Uneura .................. F16C 27/02 |
| 2018/0023620 A1* | 1/2018 | Berger .................... F16C 17/10 384/107 |
| 2018/0073553 A1 | 3/2018 | Berger |
| 2021/0310372 A1 | 10/2021 | Berger |

FOREIGN PATENT DOCUMENTS

| | | |
|---|---|---|
| DE | 102014014962 A1 | 4/2016 |
| DE | 202016105071 U1 | 12/2016 |
| DE | 102015009167 A1 | 1/2017 |
| EP | 1972759 B1 | 12/2015 |
| WO | 2014105377 A1 | 7/2014 |
| WO | 2016146189 A1 | 9/2016 |

OTHER PUBLICATIONS

International Search Report for corresponding PCT/EP2019/082253, dated Mar. 11, 2020, 11 pages (not prior art).
German Search Report for corresponding 10 2018 133 129.0, dated Jul. 30, 2019, 26 pages (not prior art).
DIN 31 652 Part 1 (16 pages) (Apr. 1983).
DIN 31 652 Part 2 (19 pages) (Feb. 1983).
DIN 31 653 Part 1 (16 pages) (May 1991).
DIN 31 653 Part 2 (8 pages) (May 1991).
DIN 31 653 Part 3 (3 pages) (Jun. 1991).
DIN 31 654 Part 1.
DIN 31 654 Part 2.
DIN 31 654 Part 3.
VDI 2204 Part 1 (33 pages) (Sep. 1992).
VDI 2204 Part 2 (36 pages) (Sep. 1992).
VDI 2204 Part 3 (34 pages) (Sep. 1992).
VDI 2204 Part 4 (16 pages) (Sep. 1992).
Co-pending U.S. Appl. No. 17/299,003, filed Jun. 2, 2021 (not prior art).
Niemann, G.; Winter, H .; B.-R.: Maschinenelemente, dated Mar. 2001, 64 pages.
Office action of Apr. 11, 2022 in U.S. Appl. No. 17/299,003 (not prior art).
Office action of Jul. 6, 2022 in U.S. Appl. No. 17/298,309 (not prior art).

* cited by examiner

EXHAUST GAS TURBOCHARGER HAVING A HYDRODYNAMIC PLAIN BEARING OR A HYDRODYNAMIC PLAIN BEARING

The invention relates to an exhaust gas turbocharger having a hydrodynamic plain bearing or to a hydrodynamic plain bearing, having a rotor and a counter-bearing part assigned to the rotor, wherein a rotor bearing surface of the rotor and a counterface of the counter-bearing part face each other to form a hydrodynamic plain bearing, in the form of a combined journal—thrust bearing, having a continuous hydrodynamically load-bearing gap formed between the rotor bearing surface and the counterface, wherein the rotor bearing surface and/or the counterface, when cut longitudinally and through the axis of rotation in sectional view, form(s) a bearing contour having merging contour sections, to generate hydrodynamic load capacities in both the radial and the axial direction, wherein a contour section, in sectional view in a first bearing area, forms a linear section that is part of a, in particular cylindrical or partially cylindrical, bearing section rotating at least sectionally about the axis of rotation, wherein a further contour section, in sectional view in a second bearing area, forms a further linear section, which is part of a further bearing section rotating at least sectionally about the axis of rotation, wherein this further linear section forms an angle with the axis of rotation, and wherein the first and the second bearing area merge into each other via a transition section.

Rotating machine elements, such as shafts, track rollers, gears or pump impellers, require guidance in the radial and axial directions to be able to transfer forces and torques. This task can be performed by hydrodynamically acting plain bearings. The function of this type of bearing is based on the physical principle of hydrodynamic pressure generation. In hydrodynamic plain bearings, a suitable lubricant is held between the rotor and the stator (counter-bearing part). When the rotor rotates relative to the stator, shear forces are generated in the lubricant, which shear forces then transport the lubricant through the bearing at a certain speed. For a converging bearing gap, this results in an increase in hydrodynamic pressure. When the gap diverges—downstream of the converging bearing gap, the pressure drops. If the relative speed between the rotor and stator is sufficiently high, the hydrodynamic pressure causes a sufficiently thick lubricant layer to build up, separating the two sliding partners. In this operating state, friction occurs in the lubricant layer (liquid friction). The hydrodynamic pressures generated in this way, in conjunction with the surface area used, balance the external forces and describe the load capacity of the plain bearing. No additional energy in the form of pressure work or a volume of lubricant supplied via grooves or pockets at a specific pressure is required to generate the hydrodynamic pressure. The load capacity results from the operating data. The fundamentals of the numerical computation of hydrodynamic pressure are presented in DIN 31652 Part 1 (DIN Pocketbook 198; Plain Bearings 2; Beuth Verlag GmbH; Berlin, Cologne 1991).

The state of the art comprises two basic types of bearings:
1. Hydrodynamic journal bearings
    Hydrodynamic journal bearings are often designed as cylindrical bushings as a segmented variant or as tilting-pad bearings. See also (DIN 31652 Part 2 and VDI Guidelines 2204). The hydrodynamically effective elements (e.g., segments) of the plain bearing are cylindrical and thus arranged in parallel to the axis of rotation. The converging gap course results from the eccentric position of the rotor relative to the stator.
2. Hydrodynamic thrust bearings
    Hydrodynamic thrust bearings are designed in the form of a thrust washer having various grooves or surface modifications in the form of retaining edges, key surfaces or spiral grooves. They can also be designed as so-called tilting-pad thrust bearings (see DIN 31653 Parts 1 to 3; DIN 31654 Parts 1 to 3). The thrust bearing is arranged orthogonally to the axis of rotation, having generally a rotating thrust collar as a mating partner. The converging course of the gap required for the generation of hydrodynamic pressure results from the design of the surface structures (pockets, ramps, etc.), from the inclination of the tiltable segments or from an angular offset between the bearing and the thrust collar.

If a technical solution results in both radial and axial loads, both of the bearing types mentioned above have to be used. The axial loads are then transferred via a thrust bearing and the radial loads via the journal bearing. The two bearing types then each have to be computed and designed separately, resulting in correspondingly high costs in both design and production.

An exhaust gas turbocharger is known from DE 10 2008 059 598 A1. It has a shaft bearing a turbine wheel and compressor wheel at its ends. Two hydrodynamic plain bearings support the shaft in a housing. They have the form of taper bearings.

Another exhaust gas turbocharger is described in WO 2014/105377 A1 and EP 1 972 759 B1. High-speed rotors supported in bearings as disclosed in EP 1 972 759 B1 are usually characterized by a relatively low load capacity, in particular in the radial direction. Because of the method of generating the hydrodynamic support film in such bearings, relatively stiff damping characteristics are required of the bearing, which in turn necessitate a relatively long design of the journal bearing to be able to transfer the radial loads resulting from the radial accelerations.

DE 20 2016 105 071 U1 describes an exhaust gas turbocharger that supports a rotor in a bearing housing. The rotor has a rotor shaft rotatably held within a counter bearing. Hydrodynamic plain bearings are provided between the rotor and the counter bearing on opposite sides of the counter bearing. For this purpose, the rotor and the counter bearing form bearing contours. The bearing contours are composed of contour sections. The bearing contours form continuous geometries in sectional view for a section along and through the axis of rotation. The continuous bearing contours are geometrically designed such that they can be continuously differentiated in sectional view and along the axis of rotation. This results in high-performance hydrodynamic plain bearings that can transfer both axial and radial loads in a very small space. Because of this compact design, however, high specific bearing forces have to be reliably transferred.

U.S. Pat. No. 5,518,319 A discloses a plain bearing having circular surfaces whose diameter varies in the circumferential direction to produce spherical, toroidal or combined cylindrical-conical bearing surfaces.

DE 850 093 C discloses a combined journal/thrust bearing having a cylindrical and a conical bearing area. A circumferential lubrication groove is arranged between these areas, separating the bearing areas from each other. The taper angle of the conical bearing area and the ratio of the cylindrical to the conical bearing area are matched to each other in accordance with the occurring radial and axial forces. In DE 850 093 C, it is assumed that the bearing forces to be supported are static in the radial and axial directions, and thus the conical part of the combined bearing can absorb part of the radial bearing force, such that the cylindrical part can be designed to be shorter pro rata, resulting in a reduction in the total friction. Static load in particular does not apply to exhaust gas turbochargers in motor vehicles.

Combined journal/thrust bearings having conical bearing areas are known, for example, from DE10 2014 014 962 A1 or DE10 2015 009 167 A1. Grooved structures are provided in the bearing area to create a pumping action. These groove structures can be used to keep the lubricant in the bearing area. Owing to their design, these known bearings have a relatively high friction, because a load capacity is achieved mainly by the pumping action of the groove structures. In addition, in such bearings, one of the "tapered" contours of either the rotor or stator is usually provided with a very large radius through the axis in sectional view to prevent seizure of the rotor, which inevitably results a variation in the film thickness of the supporting film, and consequently of the hydrodynamic efficiency of the bearing.

The invention addresses the problem of creating a friction-optimized bearing system that is easy to manufacture and ensures a reliable and effective bearing arrangement even under highly dynamic loads.

This problem is solved by the features of claim 1.

According to the invention, a combined journal/thrust bearing is proposed, in which the hydrodynamically load-bearing gap extends across both the first and second bearing areas and the transition section. This creates a hydrodynamic load capacity across the entire bearing contour. In this way, high axial and radial bearing forces can be transferred in a very small space. According to the invention, it is now further provided that the further linear section of the second bearing area forms an angle in the range from >30° to <90° with the axis of rotation. Surprisingly, this results in a reduction of the friction in the bearing. This is a simple way to increase the overall efficiency of the bearing and to further improve its performance.

Particularly preferably, provision can be made that the further linear section of the second bearing area forms an angle in the range from >45° to <75° with the axis of rotation. This renders designing high-performance hydrodynamic plain bearings for highly stressed exhaust gas turbochargers, such as those used in trucks, possible. The range from >50° to <60° is particularly preferred when high-speed hydrodynamic plain bearings with high alternating stresses, such as those encountered in passenger cars, are required. In particular, it has been shown that minimized friction results when the angle is 55°.

According to a preferred embodiment, provision may be made that the rotor bearing surface and/or the counterface has/have at least one key surface for the at least sectionally continuous tapering of the lubricant gap, and that the at least one key surface extends over both the first and the second bearing area at least sectionally and is also guided across the transition section connecting the bearing areas. This measure also initially results in a further improvement in the performance of the hydrodynamic plain bearing. In particular, the key surfaces create multiple pressure zones that keep the rotor in a stabilized position. This can have a positive effect on the smooth running of the hydrodynamic plain bearing. This is particularly advantageous for high-speed and low-load rotors that are susceptible to self-excited frequencies and associated instabilities. The key surfaces being guided across the transition section also provides improved damping of the hydrodynamic plain bearing. In particular, it can be used to attenuate a wider range of frequencies. This is particularly advantageous for hydrodynamic plain bearings subjected to high alternating loads, such as those used in exhaust gas turbochargers. Here, the clearance in the hydrodynamic gap is permanently varied, depending on the axial and radial deflection of the rotor. The inventors realized that this phenomenon can be provided for by having the key surfaces pass across the transition area. This measure therefore also results in a significantly improved running smoothness.

To further improve the load-bearing load capacity, provision may also be made that in the direction of rotation of the plain bearing the key surface or surfaces merge indirectly or directly into a latching surface extending in the circumferential direction and preferably in an arcuate shape in the circumferential direction. Because now the transition area is also provided with latching surfaces this area can also be used to increase the overall integral load capacity. It has also been shown that the effect of improved running smoothness described above is supported in this way.

According to a conceivable variant of the invention provision can be made that the rotor bearing surface and the counterface in the area of the transition section mediating the first and the second bearing area are designed in such a way that, at maximum deflection of the rotor, they rest against each other in such a way that a line contact is established, and are preferably identical. In this case, a variation in the thickness of the hydrodynamic gap at the transition from the first bearing area to the second bearing area is minimized in the area of the transition section, to achieve a maximization of the hydrodynamic load capacity. In one embodiment of a hydrodynamic plain bearing with latching surfaces in the transition area, for example, the latching surfaces in the transition area can be designed in such a way that they form a line contact in the direction of the axis of rotation when the plain bearing is in the normal position.

A possible embodiment of the invention may be such that the transition section comprises or forms at least two linear transition sections. Such a transition section can be easily manufactured, for example by machining. If provision is also made that the first linear transition section closer to and facing the first bearing area forms a smaller angle with the axis of rotation than the second linear transition section facing the second bearing area, an improved lubricant flow in the transition section results. For this purpose, provision may also or additionally be made that two arcuate transition sections having different curvature contours are used.

A hydrodynamic plain bearing according to the invention can be designed such that the linear transition section is adjoined on both sides in each case by an arcuate transition section, and in that preferably one of the arcuate transition sections merges indirectly or directly into the rotor bearing surface of the rotor or the counterface of the counter-bearing part. This results in a continuous transition of the linear transition section into the areas adjacent in the direction of the axis of rotation. This results in a more uniform pressure build-up in the transition section, which has a positive effect on the performance of the hydrodynamic plain bearing.

Particularly preferably it is conceivable that the rotor bearing surface and/or the counterface form(s) a continuous and at least once continuously differentiable bearing contour, when cut longitudinally and through the axis of rotation in sectional view to generate hydrodynamic load capacity across the entire bearing contour. This measure is used to generate hydrodynamic bearing capacity throughout the transition section and the adjacent sections of the first and second bearing areas. At a similar load capacity of the bearing, the geometric dimension of the hydrodynamic plain bearing can be reduced even further based on this measure.

It is conceivable that the contour sections of the first and the second bearing area merge indirectly or directly in the transition section via a rounded area, wherein preferably a rounding radius in the range from 0.3 mm to 1.5 mm is provided, and/or that the rounding radius is in the range from 5% to 25% of the mean diameter of the transition section. Such relatively small rounding's cause a relatively high load capacity at high rotor deflection, and thus good damping behavior, for purposes of application in high-speed machines, such as exhaust gas turbochargers, and are also relatively easy to manufacture.

In an alternative embodiment of the invention, the transition section can adjoin the first and/or the second bearing area via a kink extending in the circumferential direction. It is also conceivable that two linear transition sections or two arcuate transition sections or one linear transition section and one arcuate transition section are interconnected within the transition section by a kink extending in the circumferential direction. Such geometries are easy to manufacture and also contribute to smooth the transition between the two bearing areas, for the purpose of effective bearing force generation in the transition area.

For an effective supply of lubricant both to the two bearing areas and to the transition section, provision can be made that at least one oil feed groove is introduced in the rotor bearing surface and/or the counterface, which groove extends at least sectionally in the direction of the axis of rotation or revolves around the axis of rotation in a helical manner, in particular at a pitch angle of ±20°, and/or which forms an angle of ±20° with this axis of rotation at least sectionally, and in that the oil feed groove extends at least sectionally across the first and/or the second bearing area and the transition section. With this slightly angular setting of the oil feed groove, the pumping action is either supported or reduced by the rotary motion of the rotor. Larger setting angles of the oil feed groove result in a disproportionately increased pumping action, and thus improved oil supply to the bearing areas or transition section, but at the expense of overall efficiency. A larger setting angle of the oil feed groove in the opposite direction results in a reduction in the pumping effect, which can result in higher oil temperatures in the lubrication gap and thus in a reduced load capacity.

The oil feed grooves preferably extend along the entire axial length of the contour section of the first bearing area. Accordingly, the oil feed grooves have a feed section that opens into a transition area. The transition area introduces the lubricant into this contour section. The oil feed grooves also extend from this contour section across the adjoining contour sections of the transition section and the second bearing area. Downstream from the contour section of the second bearing area, the oil feed grooves open into the environment.

Alternatively, provision can also be made that the oil feed groove can also end on the contour section of the second bearing area, particularly preferably centrally on this contour section. In particular, this permits the oil flow to be regulated and/or limited, thereby ensuring a sufficient oil lubrication of the thrust bearing part.

For the design of an efficient bearing arrangement, in which the hydrodynamic plain bearing can be easily mounted using few parts, provision can be made according to the invention that the bearing surface of the rotor is formed by a rotor part, which is connected to a rotor shaft and is held on the rotor shaft, that the rotor part is supported relative to the rotor shaft in the area of a support section of the rotor shaft, and that the support section and at least one of the contour sections of the counter-bearing part overlap at least sectionally in the direction of the axis of rotation.

During operation, high bearing forces are generated in the area of the hydrodynamic plain bearing, as mentioned above in the discussion of the state of the art. The inventors have now realized that a reliable load transfer of these, in particular high radial loads from the hydrodynamic plain bearing to the rotor shaft is required to guarantee a reliable operation. For this purpose, it is also proposed to overlap the support section supporting the rotor part relative to the rotor shaft in the direction of the axis of rotation with at least one of the contour sections of the counter-bearing part, preferably with the bearing area, where largely supports the radial loads. In this way, a direct force transfer in the radial direction and on a direct path from this contour section via the support section into the rotor shaft is achieved. The rotor part remains easy to mount, as it can be pushed for instance onto the rotor shaft, wherein the support section then is assigned to the corresponding bearing area of the rotor part. In the assembled state, the rotor part is held in a particularly tilt-resistant manner, which means that the lubricant gap in the hydrodynamic plain bearing is reliably maintained during operation, even under changing loads.

According to a preferred variant of the invention provision can be made that the rotor part has a bearing area forming the contour sections, and that the bearing area is arranged such that at least one of these contour sections overlaps the support section at least sectionally in the direction of the axis of rotation. The fact that the rotor part directly forms the contour sections for the bearing area significantly reduces the number of parts required. Owing to the small number of components of the plain bearing, in the bearing area adjoining the support section in the radial direction, the sum of the manufacturing tolerances in this direction is also minimized, resulting in a dimensionally accurate and easily reproducible finished bearing arrangement, in which the bearing clearance in the hydrodynamic plain bearing can be precisely observed.

According to a preferred embodiment of the invention provision can be made that the radial clearance between the support section of the rotor shaft and the area of the rotor part abutting the support section is smaller than the radial clearance between the rotor part and the thrust bearing part, preferably less than 80%, particularly preferably less than 60% of the radial clearance between the rotor part and the thrust bearing part.

It has been shown that a snug fit between the support section of the rotor shaft and the bearing area of the rotor part results in a reliably operating plain bearing if a snug fit is provided between the support section of the rotor shaft and the area of the rotor part abutting the support section, which snug fit has a relative radial bearing clearance between the rotor and stator of the hydrodynamic plain bearing in the range from −6 to +6 per mil, in relation to the diameter of the support section. A good compromise between the unbalance behavior of the rotor and an easy assembly of the rotor part is achieved if provision is made that a radial clearance is formed in this fit in accordance with the ISO basic tolerance class IT3 to IT8.

An arrangement designed in accordance with one or more of the above sizing specifications is particularly suitable for use in an exhaust gas turbocharger for a passenger car. In particular, only minor imbalances occur with such an arrangement. In addition, a sufficient lubrication gap in the hydrodynamic plain bearing is always guaranteed. Even the minimum lubrication gap thickness possible in this context is dimensioned such that a sufficient lubricant flow is possible for the special type of bearing according to the invention. This lubricant flow is then also in particular such that no vortex flows resulting in an annoying acoustic disturbance occur in the lubricant within the lubricant gap of the hydrodynamic plain bearing. In particular, such a hydrodynamic plain bearing does not generate any self-exciting vortex flows in the lubricant.

A particularly preferred variant of the invention is such that the counter-bearing part is installed in a bearing housing or a housing part, that a preferably circumferential gap area is formed between an outer contour of the counter-bearing part and the bearing housing or the housing part, wherein the gap area is spatially connected to a lubricant guide channel. Preferably, the gap area and the support section can overlap at least sectionally in the direction of the axis of rotation. A trapped oil film can be generated in the gap area. This is possible because the gap area is connected to a lubricant supply, for instance using a pressure pump. In this way, by displacing the lubricant, a pressure and thus the load-bearing trapped oil film is generated in the gap area.

The bearing types used within the scope of the invention having a preferably continuous and particularly preferably continuously differentiable bearing contour, which have different contour sections, are as such characterized by a particularly smooth-running and low-noise mode of operation. Therefore, the gap area can be dimensioned to provide a relatively soft damping effect of the trapped oil film. Consequently, a bearing design having a soft damping characteristic in the area of the trapped oil film is the result. And ultimately, because of the softer damping characteristic, a lower load capacity of the hydrodynamic bearing is required, resulting in a further reduction of the size of the hydrodynamic plain bearing, and thus its friction.

When the trapped oil film is designed having a soft damping characteristic to reduce the friction, it should also be noted that a soft damping characteristic entails an increased deflection of the rotor, which causes an increase in the contour gaps between the turbine or compressor wheel and the turbine or compressor wheel housing.

For this purpose and to adjust the damping characteristic, provision may be made within the scope of the invention that a relative clearance extending in the radial direction related to the outer diameter of the gap area in the range from 5 to 10 per mil is formed between the counter-bearing part and the bearing housing or the housing part in the gap area. A relative clearance in the range from 7 to 9 per mil, based on the outer diameter of the gap area, is particularly suitable for use in exhaust gas turbochargers of passenger cars. In this way, an advantageous compromise between the lowest possible deflection and the softest possible damping characteristics, for optimizing the overall efficiency of the turbocharger, consisting of compressor and turbine efficiency and the efficiency of the bearing is achieved.

The splitting area usually has the shape of a hollow cylinder. In principle, it is also conceivable that the gap area has a different geometry, in particular that of a hollow cone. In that case, where the gap area has a different geometry, the outer diameter referred to is the mean diameter.

According to a conceivable variant of the invention, provision may be made that the radial clearance between the counter-bearing part and the bearing housing or the housing part is greater than the radial clearance between the rotor part and the counter-bearing part.

According to one conceivable variant of the invention, the radial clearance between the counter-bearing part and the bearing housing (or the housing part) and the axial extension of the gap area is defined by the relation:
the axial extension of the gap area in millimeters equals 9 minus C times the radial clearance between the counter-bearing part and the bearing housing in millimeters, wherein C is in the range from 61 to 75. Preferably, C is selected in the range from 66 to 70.

In this way, a relatively soft damping characteristic can be achieved in the trapped oil film. This permits low radial bearing forces to be realized. In this way, the required axial bearing length and, consequently, the friction power can be reduced without having to put up with significant losses in the thermodynamic efficiency of the turbine and the compressor. This is of particular importance in high-speed applications, for instance modern exhaust gas turbochargers above 200,000 rpm.

In this context, the lower (because of the adapted damping characteristic) required load capacity of the hydrodynamic plain bearing can be implemented in particular by dimensioning the axial overlap in the direction of the axis of rotation between the counter-bearing part and the bearing housing or the housing part in the gap area for the formation of a trapped oil film such that the ratio of the extension of the gap area in the direction of the axis of rotation to the radial clearance between the counter-bearing part and the bearing housing or the housing part is:
the axial extension of the gap area in the direction of the axis of rotation/radial clearance=40 to 80.
Particularly preferably, this ratio can be selected in the range from 45 to 70.

To reduce the number of parts required, provision can be made for the rotor part to have a base part which is provided with at least one seal mount, in which a circumferential sealing element is inserted.

To be able to guarantee an exact assignment of the rotor part to the counter-bearing part, provision can be made according to one embodiment of the invention that the rotor part has a neck having a stop surface, and that the whole surface of the stop surface strikes against a radially extending surface of a collar of the rotor shaft.

The specified full-faced contact also renders the application of an axial clamping force to the rotor part possible, clamping it between a compressor wheel and the collar, preferably under the action of a screw connection, secured axially and held non-rotatable in the circumferential direction. This measure results in a simple assembly with few parts.

As indicated above, the individual measures discussed above are particularly suitable in connection with a special advantageous bearing type according to the invention, wherein the continuous bearing contour, consisting of the two or more contour sections, of the rotor bearing surface and/or the counterface is designed to be continuously differentiable when cut longitudinally and through the axis of rotation in sectional view. With this type of bearing, hydrodynamic load capacities can be generated across the contour sections and preferably the entire bearing contour in both the axial and the radial direction.

As mentioned above, as multi-surface plain bearings, the hydrodynamic plain bearings can be equipped with two or more lubricating keys.

With the continuous bearing contour varying in cross-section, in particular in the area of the converging gap of the hydrodynamic plain bearing, pressure areas can be generated that transfer both axial and radial loads. This results in 3-dimensional hydrodynamic load capacities in the hydrodynamic journal bearing. The invention uses the physical effect according to which the locally generated hydrodynamic pressure acts normally on a surface. This results in local load capacities. Because the surface of the bearing contour can be designed three-dimensionally within the scope of the invention, this results in local force components with corresponding directions. The load capacity components of the bearing and thus the three-dimensional load capacity can be computed from the integral sum of the individual force components and then designed accordingly for the desired application.

As indicated above, the hydrodynamic plain bearings can be equipped with two or more lubricating keys as multi-surface plain bearings. Segmentation of the bearing in the area of the contour sections reduces friction. In addition, the axial load capacity of this bearing is also improved, because a continuous and continuously differentiable transition is created between the individual contour sections. This results in a higher overall load capacity while maintaining the same friction. Segmentation of the bearing arrangement also results in a further reduction in noise emission.

According to a possible variant of the invention, provision can be made that a preferably annular clearance space is formed in the direction of the axis of rotation between the rotor shaft and the rotor part, indirectly or directly next to the support section. This results in a definite support of the rotor part at the support section. In addition, owing to the shorter guide length of the rotor part assembly is simplified. Particularly preferably, provision can be made that the clearance space is formed by an enlargement of the diameter of that part of the rotor, which adjoins the bearing area of the rotor part. This simplifies the manufacturing process. In addition, the rotor shaft can then remain unaffected in this area, resulting in greater stability.

The invention is explained in greater detail below based on an exemplary embodiment shown in the drawings. In the Figures:

FIG. 1 shows a sectional view of an exhaust gas turbocharger,

FIGS. 2 and 3 show enlarged detailed illustrations taken from FIG. 1, FIG. 4 shows a counter-bearing part, which can be installed in the exhaust gas turbocharger according to FIGS. 1 to 3, in perspective view, FIG. 5 shows the counter-bearing part according to FIG. 4 in full section, FIGS. 6 and 7 show counter-bearing parts of an alternative design to that shown in FIGS. 4 and 5, which counter-bearing parts can be installed in the exhaust gas turbocharger according to FIGS. 1 to 3, FIG. 8 shows an enlarged detailed side view of a rotor shaft of the exhaust gas turbocharger according to FIGS. 1 to 3, FIG. 9 shows an enlarged detailed representation taken from FIG. 8, FIGS. 10 and 11 show enlarged detailed illustrations of a rotor shaft, as an alternative to the design according to FIG. 9.

Figure 1:
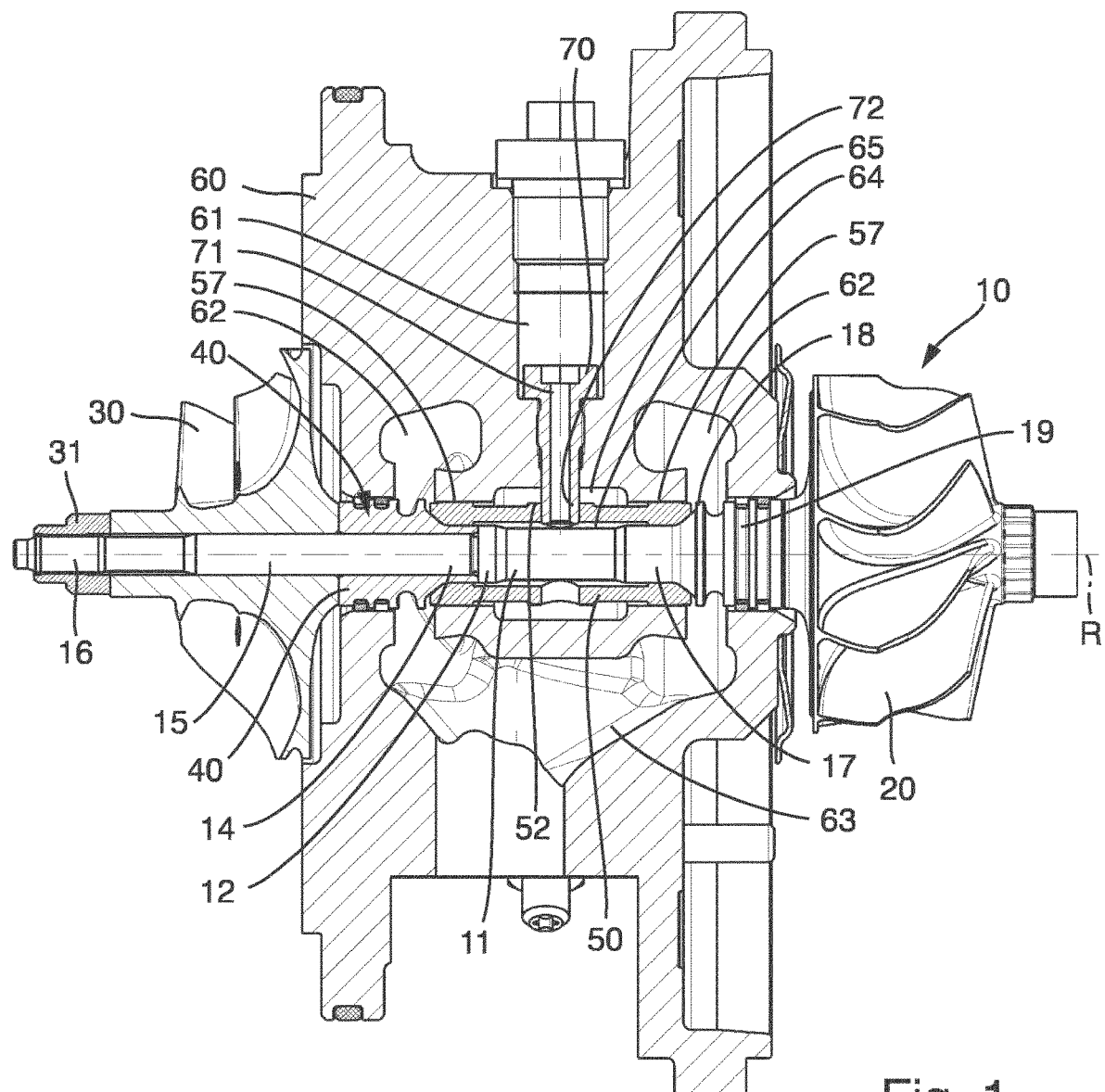
FIG. 1 shows a side view of an exhaust gas turbocharger and a sectional view through the axis of rotation R. The exhaust gas turbocharger has a rotor 10 and a rotor shaft 11.

The rotor shaft 11 has a center section that may be tapered. At its end facing the compressor, the center section has a stop 13. Accordingly, a circumferential collar 12 can be formed between the stop 13 and the taper of the center section. The stop 13 can be seen in FIG. 2. As this representation illustrates, the stop 13 can preferably be designed as a shaft shoulder having a radially aligned surface, which rotates in an annular manner. Adjacent to the collar 12, the rotor shaft 11 has a support section 14 on the compressor end. It can have the form of a circumferential machined surface. The support section 14 merges into a shaft section 15, which then terminates in a threaded section 16.

Figure 3:
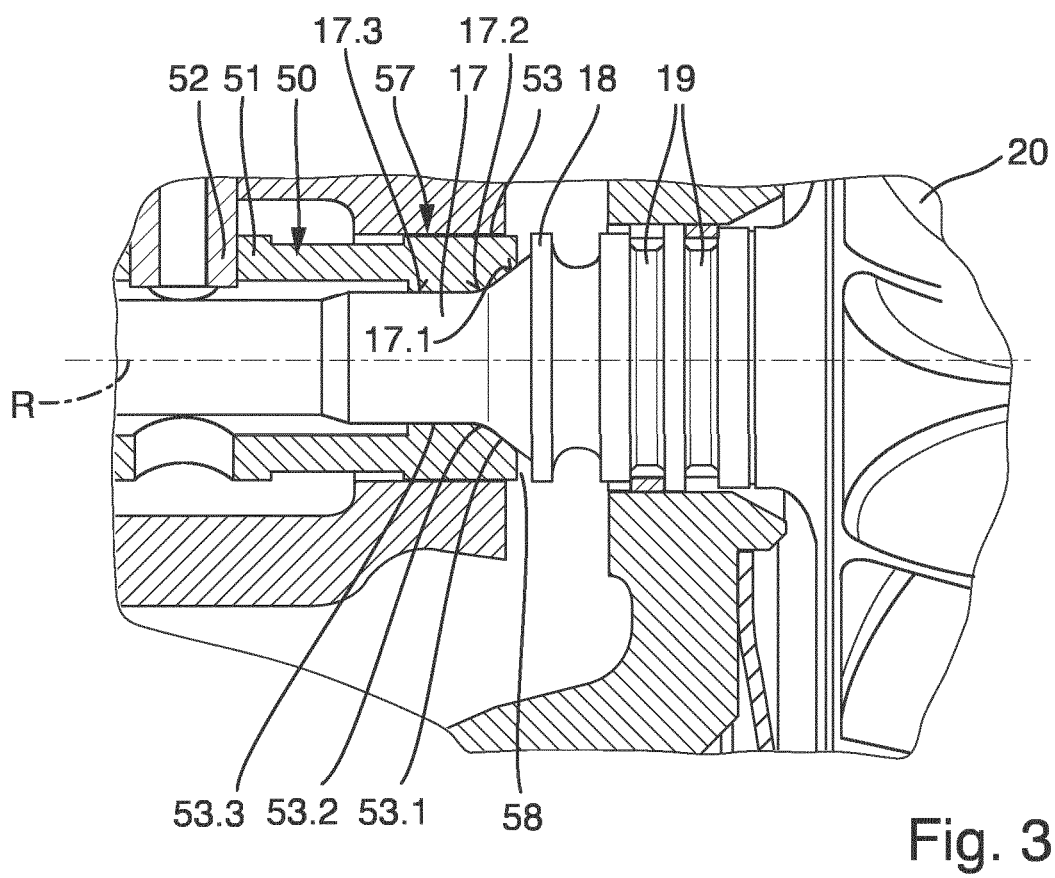

A bearing section 17 can preferably be provided on the end of the rotor shaft 11 opposite from the threaded section 16. The bearing section 17 may be formed from the rotor shaft 11 by machining the latter. As shown in FIG. 3, the bearing section 17 of the rotor shaft 11 has a circumferential bearing contour. This bearing contour has several contour sections 17.1 to 17.3 and is preferably formed integrally with the rotor shaft 11. The contour section 17.1 that transfers axial forces or radial and/or axial forces can, for instance, be designed frustoconical to absorb any radial forces. It can also be convex or concave in shape. The contour section 17.3 can be cylindrical. The contour section 17.2 interconnects two contour sections 17.1 and 17.3. The assignment is made such that the contour sections 17.1 to 17.3 merge continuously into one another and form the continuous bearing contour in that way.

In a section through the axis of rotation R of the rotor shaft 11, as illustrated in FIG. 3, the bearing contour is designed to be continuously differentiable for instance along the axis of rotation R.

It is also conceivable that the contour sections 17.1 to 17.3 are formed by a multiple-times continuously differentiable function, and in that way form a bearing contour having a constant curvature.

Downstream of the contour section 17.1, the rotor shaft 11 may have a deflector 18 in the form of an oil slinger, for instance in the form of an enlarged diameter. In this exemplary embodiment, the enlarged diameter is formed as a circumferential collar. However, the deflector 18 can also have another suitable contour that effectively prevents or at least reduces oil leakage through the shaft passage in the bearing housing.

The rotor shaft 11 can also have at least one seal mount 19, as FIG. 3 shows. In this exemplary embodiment, two seal mounts 19, for instance in the form of piston ring grooves, arranged axially spaced apart from one another are used. Piston rings are inserted in the seal seats 19. A turbine wheel 20 is arranged at the end of the rotor shaft 11 opposite from the compressor wheel. The turbine wheel 20 is generally materially bonded to the rotor shaft 11.

The rotor 10 has a rotor part 40 on the end facing away from the turbine wheel 20. This rotor part 40 is illustrated magnified in FIG. 2. As this illustration shows, the rotor part 40 has a base part 41. The base part 41 can, for instance, have at least one circumferential seal mount 42 in the form of a piston ring groove. In this exemplary embodiment, two circumferential seal mounts 42 are used. Annular sealing elements 43 in the form of piston rings are inserted into the seal mounts 42.

The rotor part 40 has a bearing section 44 adjacent to the base part 41. The bearing section 44 forms a circumferential bearing contour that may be similar or identical in design to the bearing contour having the contour sections 17.1 through 17.3, wherein the bearing section 44 has the contour sections 44.1 through 44.3 forming the bearing contour. The contour section 44.1 for absorbing the axial loads is preferably frustoconical, but can also be convex or concave. Furthermore, a cylindrical contour section 44.3 is again used to absorb radial loads. The two contour sections 44.1 and 44.3 are interconnected by the interposition of the contour section 44.2, or are merged into each other by means of the contour section 44.2. The contour section 44.2 can have a concave shape similar to the contour section 17.2. The contour sections 44.1 to 44.3 form the continuous bearing contour.

Figure 2:
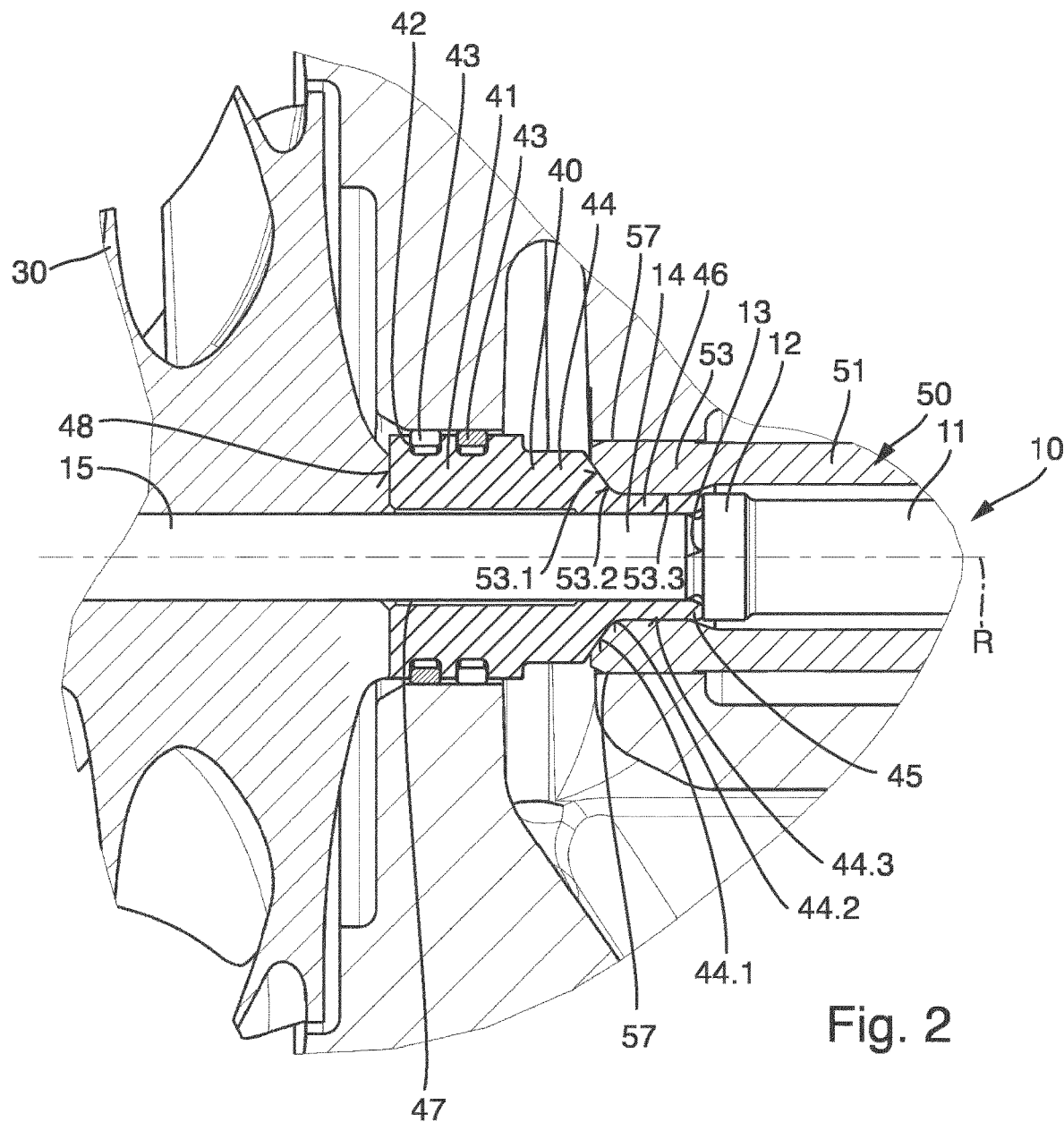

In a section through the axis of rotation R according to FIG. 2, the bearing contour can form for instance a continuous and continuously differentiable contour in sectional view. This can be clearly seen in the drawing, wherein the contour sections 44.1 to 44.3 merge continuously into one another without jumps in continuity.

As with the bearing contour 17.1 to 17.3 at the turbine end, it is also conceivable here that the contour sections 44.1 to 44.3 are formed by a function that can be continuously differentiated several times, and thus form a bearing contour having a continuous curvature.

At its end facing the collar 12, the rotor part 40 may have a neck 45. It is preferably formed by the bearing section 44. The end face of the neck 45 is radially aligned. In this way, the end face of the neck 45 rests against the stop 13 of the collar 12. To guarantee a flat contact, the neck 45 is chamfered all around on the inside. In addition, an undercut is lathed into the rotor shaft 11 adjoining the collar 12 for this purpose, as FIG. 2 shows.

The rotor member 40 abuts the support section 14 of the rotor shaft 11 at the bearing section 44 forming the bearing area 46. In this case, a snug fit is formed between the rotor part 40 and the rotor shaft 10, preferably in the form of a transition fit. Preferably, a transition fit in accordance with the ISO basic tolerance class IT3 to IT8 is implemented. The drilled hole, which is made in the bearing area 46 and is used to bear against the support section 14, has an enlarged diameter adjacent to the bearing area 46, forming a recess 47. By means of the recess 47, an annular clearance is obtained between the rotor part 40 and the outer circumference of the rotor shaft 11.

The base part 41 has an annular and radially extending contact surface 48. This contact surface 48 is thus parallel to the contact surface of the bearing section 44, which rests against the collar 12.

A compressor wheel 30 is pushed onto the rotor shaft 11 in the area of the shaft section 15. A radially extending contact surface of the compressor wheel 30 rests against the contact surface 48 of the rotor part 40. A nut 31 is bolted onto the threaded section 16 to secure the rotor part 40 and the compressor wheel 30. Consequently, the nut 31 clamps the compressor wheel 30 against the rotor part 40 and the rotor part 40 against the stop 13. In this way, both the compressor wheel 30 and the rotor part 40 are axially secured on the rotor shaft 11 and held thereon for co-rotation in the circumferential direction.

As can be seen in FIG. 1, the exhaust gas turbocharger has a counter-bearing part 50, which is inserted into a bearing housing 60 of the exhaust gas turbocharger. The counter-bearing part has a center part 51. Lugs 53 adjoin the center part 51 on both ends. The two lugs 53 each have a circumferential bearing contour. This circumferential bearing contour is designed complementary to the bearing contour formed by the rotor part 14 or the bearing section 17 of the rotor shaft 11. Accordingly, these bearing contours have contour sections 53.1 to 53.3, which can again be circumferential. The contour section 53.1 which absorbs the axial forces is, for instance, frustoconical and the contour section 53.3 is, for instance, cylindrical. The two contour sections 53.1 and 53.3 merge at least once in a continuously differentiable and continuous manner via the contour section 53.2.

To assemble the assembly according to FIG. 1 for an exhaust gas turbocharger, the counter-bearing part 50 is first inserted into a suitably prepared mount of the bearing housing 60. A locating element 70 is used to secure the predetermined position of the counter-bearing part 50 in the bearing housing 60 as shown in FIG. 1. The locating element 70 has a retaining section 72. This retaining section 72 engages with a locating mount 52 of the counter-bearing part 50. To mount the locating element 70, it can be inserted through a lubricant guide channel 61 of the bearing housing 60. To hold the locating element 70 captive, it can be screwed in, pressed in or secured with a retaining element to the bearing housing 60.

The rotor 10 can be installed after the counter-bearing part 50 is mounted in the bearing housing 60. For this purpose, the rotor shaft 11 is inserted into a drilled hole of the bearing housing 60 from the bearing housing end at the turbine end. The rotor shaft 11 passes through the counter-bearing part 50, as shown in FIG. 1. The insertion motion of the rotor 10 is limited by the contour section 17.1 of the rotor shaft 11, which rests against the associated contour section 53.1 of the counter-bearing part (see FIG. 3). In the assembled position, the sealing elements, which have been inserted into the circumferential seal mount 19, abut an associated annular sealing surface of the bearing housing 60 (see FIG. 3).

The rotor part 40 can now be inserted into the bearing housing 60 from the opposite end. In the process, the bearing area 46 of the rotor part 40 is pushed headfirst onto the rotor shaft 11. This is easily accomplished because the rotor part 40 is only guided with a precise fit on the rotor shaft 11 in the bearing area 46. In addition, the recess 47 does not impede the insertion motion. The rotor part 40 strikes against the collar 12 in the assembly position according to FIG. 2. Then the compressor wheel 30 is pushed onto the rotor shaft 11 and the nut 31 is screwed on (see description above). In the assembled state, the rotor 10 is arranged such that its contour sections 53.1 to 53.3 on both lugs 53 are located opposite from the contour sections 17.1 to 17.3 and 44.1 to 44.3, respectively. In so doing, the allocation is made such that a bearing clearance is created in which two hydrodynamic films are guided to create two hydrodynamic plain bearings. The relative radial and the relative axial bearing clearance of every hydrodynamic plain bearing is preferably in the range from 1 to 5 per mil of the diameter of the contour sections 17.3 or 44.3 transferring radial forces. As FIG. 1 shows, a circumferential gap area 57 is created between one, preferably both, lugs 53 of the counter-bearing part 50 and the bearing housing 60. This gap area has a relative radial clearance (absolute radial clearance/ diameter of the counter-bearing part 50 in the gap area 57) extending in the radial direction in the range from 5 to 10 per mil, particularly preferably in the range from 7 to 9 per mil.

The gap area 57 is preferably arranged such that at least one of the contour sections 44.1 to 44.3 or 17.1 to 17.3 overlaps the gap area 57 in the direction of the axis of rotation R, particularly preferably the overlap is provided at least in the area of the contour sections 17.3 and 44.3, which provide a significant contribution to the load capacity of the hydrodynamic plain bearing in the radial direction. The axial overlap in the direction of the axis of rotation R between the counter-bearing part 50 and the bearing housing 60 in the gap area 57 is preferably such that the ratio of the extension of the gap area 57 in the direction of the axis of rotation R to the radial clearance between the counter-bearing part 50 and the bearing housing 60 or the housing part is:

the axial extension of the gap area 57 in the direction of the axis of rotation $R$/radial clearance=40 to 80

Particularly preferably, this ratio is in the range from 45 to 70.

A trapped oil film is created in the gap area 57 based one or more of the aforementioned dimensional specifications. This trapped oil film has high axial load capacity for the hydrodynamic plain bearings of the invention for common exhaust gas turbocharger applications. A trapped oil film designed with a suitable damping coefficient is particularly suitable for reducing the bearing forces that result in particular from an unbalance and from load change processes during operation. In this way, a particularly low-noise exhaust gas turbocharger is created on the one hand, and a friction-enhanced exhaust gas turbocharger on the other.

The two gap areas 57 are spatially connected to the lubricant guide channel 61. Pressurized lubricant can be supplied via the lubricant guide channel 61. It passes through a channel 71 of the locating element 70 into a chamber 64. From the chamber 64, the lubricant is forced into the gap areas 57. In this way, adaptable damping by means of the trapped oil film in the annular gap area 57 can be implemented. From the same chamber 64, the lubricant is also supplied to the two hydrodynamic plain bearings. Accordingly, the lubricant enters the area of the hydrodynamic gap formed between the contour sections 44.1 to 44.3 of the rotor 10 and the associated contour sections 53.1 to 53.3 of the counter-bearing part on the one hand and the contour sections 17.1 to 17.3 and the associated contour sections 53.1 to 53.3 on the other. As the rotor 10 rotates, the lubricant is directed across the hydrodynamic gap of the hydrodynamic journal bearings to generate a hydrodynamic pressure. Downstream of the hydrodynamic gap, the lubricant enters a centrifugal space 62. The gap areas 57, for instance, may also open into this centrifugal space 62. The lubricant is collected in a collection area 63 of the bearing housing 60, returned to the lubricant circuit and again routed to the lubricant guide channel 61.

According to FIG. 2, as mentioned above, the rotor part 40 is supported in the area of a support section 14 of the rotor shaft 11 relative to the rotor shaft 11.

Here, the assignment is such that the support section 14 and at least one of the contour sections 53.1 to 53.3 of the counter-bearing part 50 overlap in the direction of the axis of rotation R, at least sectionally. The overlap is preferably present in the area of the contour sections 17.3 or 44.3.

Figure 4:
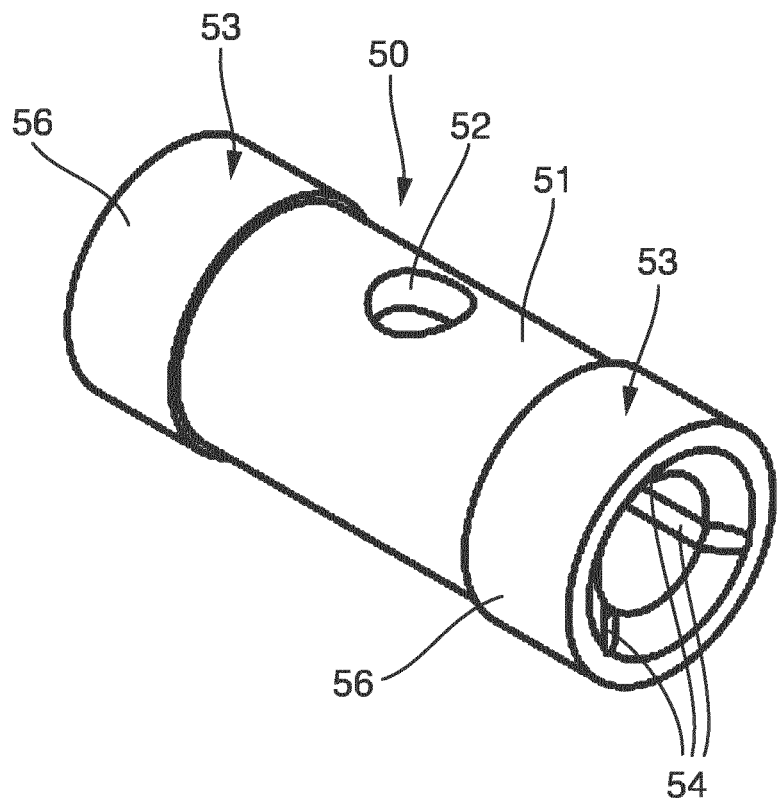
Figure 5:
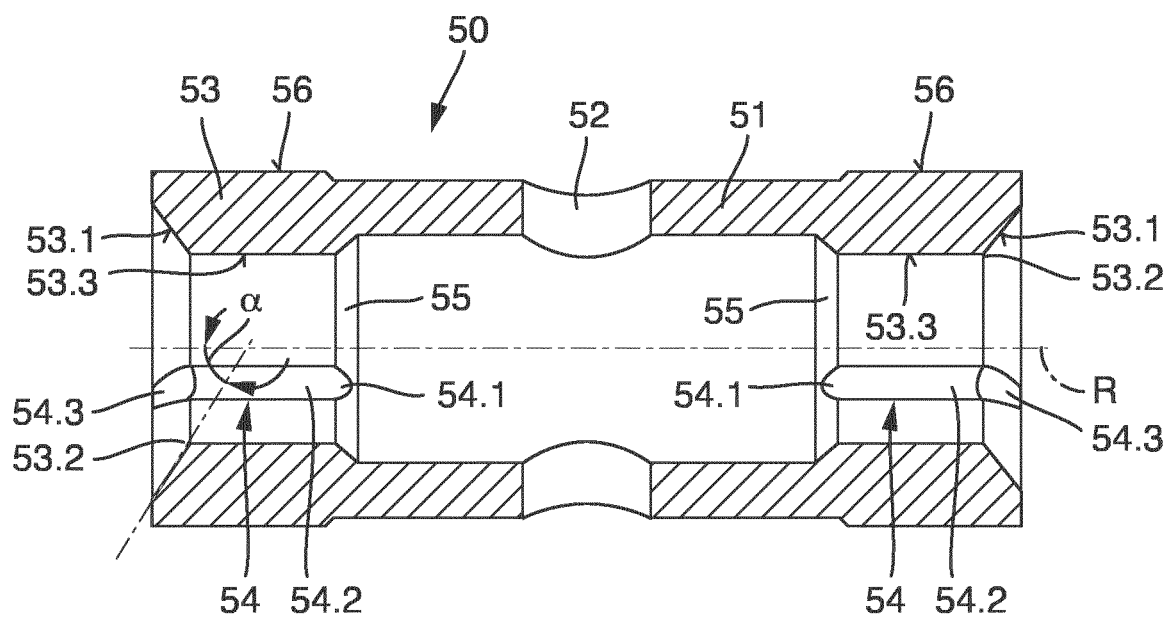

FIGS. 4 and 5 show an alternative embodiment of a counter-bearing part 50. In principle, this counter-bearing part 50 has the same shape as the counter-bearing part 50 described above. Therefore, identical reference numerals are used for identical components. In this respect, reference is also made to the explanations above. To avoid repetition, the differences are discussed below.

The counter-bearing part 50 again has two lugs 53. The lugs 53 are designed with a counterface facing the rotor bearing surfaces of a rotor 10. The counterface is composed of the contour sections 53.1, 53.2, 53.3. The counterface forms a basic cylindrical contour with the contour section 53.3. This basic cylindrical contour is provided with three lubricating keys on its circumference, which lubricating keys can be stamped into the basic cylindrical contour; accordingly, three lubricating keys rise in the contour section 53.3. These lubrication keys continuously taper the hydrodynamic gap in the direction of the bearing center up to the latching surface. Oil feed grooves 54 are formed in the counter-bearing part 50 between the individual lubrication keys. The oil feed grooves 54 preferably extend along the entire axial length of the contour section 53.3. Accordingly, the oil feed grooves 54 have a feed section 54.1 that opens into a transition section 55. The transition area 55 transfers the center section of the counter-bearing part to the contour section 53.3. The oil feed grooves 54 extend from the contour section 53.3 also across the contour section 53.2 and the contour section 53.1. The oil feed grooves 54 open into the environment downstream from the contour section 53.1. The lubrication keys may also be referred to as lubrication wedges, and the latching surfaces may also be referred to as resting surfaces, as described in the aforementioned DIN 31653 Parts 1 to 3 and DIN 31654 Parts 1 to 3, and as described in U.S. Patent Publ. No. 2018/0073553 (see paragraph [0050]), all of which are incorporated herein by reference.

Figure 12:
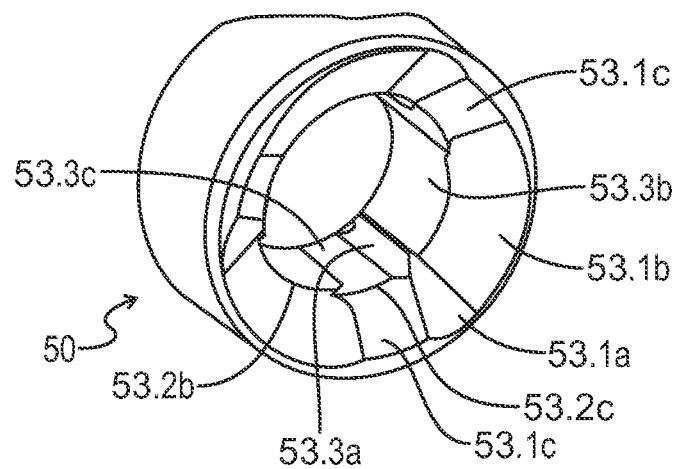
FIG. 12 shows an enlarged perspective view of the counter-bearing part of FIGS. 4 and 5.
Figure 13:
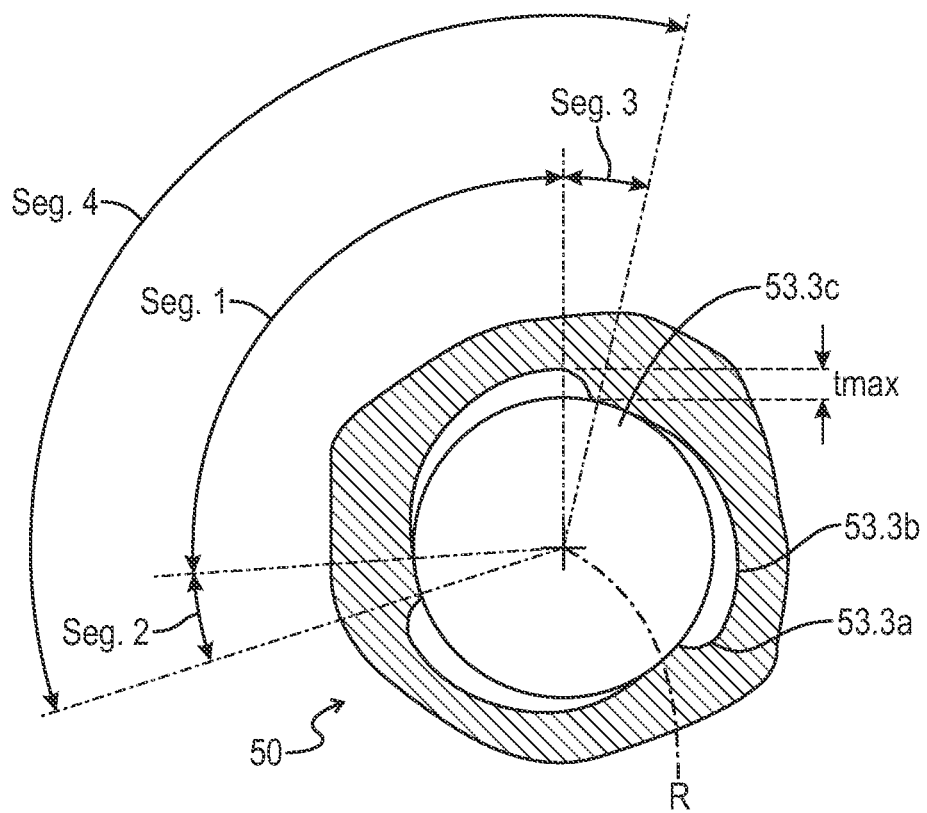
FIG. 13 shows a schematic section view through the longitudinal center axis of the bearing region of the counter-bearing part of FIGS. 4 and 5.

As noted counterface 53 comprises contour sections 53.1 and 53.3. Contour section 53.1 is embodied substantially in the shape of a truncated cone. Contour section 53.3 is of substantially cylindrical configuration. The two contour sections 53.1 and 53.3 are led into one another via a transition section 53.2. Transition section 53.2 is constituted by a substantially convex curvature. The configuration of contour sections 53.1 and 53.3, and of transition section 53.2, is evident in more detail from FIGS. 12 and 13. As those drawings show, contour sections 53.1 and 53.3 and transition section 53.2 are configured in the form of a multiple-surface plain bearing. As is evident from FIG. 13, sectors Seg. 4 are accordingly used, three sectors Seg. 4 being utilized in the present exemplifying embodiment. Sectors Seg. 4 are recessed into the bearing sleeve in the form of depressions. Each sector comprises a respective lubrication wedge 53.1*b*, 53.2*b*, and 53.3*b*. Lubrication wedge 53.1*b*, 53.2*b*, and 53.3*b* is concavely curved. Lubrication wedges 53.1*b*, 53.2*b*, and 53.3*b* exhibit their greatest contour depth tmax in the region of a transition region 53.1*a*, 53.2*a*, 53.3*a*. The contour depth, i.e. the distance from rotation axis R of the plain bearing, decreases continuously proceeding from this transition region 53.1*a*, 53.2*a*, 53.3*a*. This is evident in particular from FIG. 13. This drawing is a section perpendicular to rotation axis R and through contour segment 53.3, which constitutes the substantially cylindrical bearing part of counter-bearing part 50. As is further shown by this drawing, lubrication wedge 53.1*b*, 53.2*b*, 53.3*b* transitions at its end facing away from transition region 53.1*a*, 53.2*a*, 53.3*a* into a resting surface 53.1*c*, 53.2*c*, 53.3*c*. In FIG. 13, transition region 53.1*a*, 53.2*a*, 53.3*a* is labeled "Seg. 3," and resting surface 53.1*c*, 53.2*c*, 53.3*c* is labeled "Seg. 2." The extent of lubrication wedges 53.1*b*, 53.2*b*, 53.3*b* is labeled "Seg. 1." As is evident in particular from FIG. 12, one lubrication wedge 53.1*b*, 53.3*b* of the first and second contour segment 53.1, 53.3, and one lubrication wedge 53.2*b* of transition segment 53.2, respectively constitute a bearing sector. For the bearing shown, three bearing sectors are used. A different number of bearing sectors can, of course, also be used. Lubrication wedges 53.1*b*, 53.2*b*, and 53.3*b* transition continuously into one another in the region of a bearing sector. A continuous, and continuously differentiable, bearing contour is thereby formed in a section view, in the context of a section longitudinally and through rotation axis R. As the drawings further show, transition regions 53.1*a*, 53.2*a*, 53.3*a* and resting surfaces 53.1*c*, 53.2*c*, 53.3*c* can also transition into one another.

Alternatively, provision can also be made that the oil feed groove 54 can also end on the contour section 53.1, particularly preferably centrally on this contour section 53.1. In particular, this permits the oil flow to be regulated and/or limited, thereby ensuring a sufficient oil lubrication of the thrust bearing part.

The embodiments described above, concerning the oil feed groove 54 and the lubricating keys, can also be implemented in the exemplary embodiment as described above with reference to FIGS. 1 to 3.

In this exemplary embodiment, the contour section 53.2 forms a transition section between the two contour sections 53.1 and 53.3. The contour section 53.2 forms a circumferential kink in the transition section, wherein this circumferential kink is interrupted in the area of the oil feed grooves 54. A circumferential kink may also be referred to as a discontinuity of the contour section extending in a circumferential direction.

The contour section 53.1 adjoins the contour section 53.2. In its basic form, this contour section 53.1 is designed as a cone mount. The lubrication keys of the contour section 53.3 continue across the transition section in the contour section 53.1. Accordingly, the lubrication keys rise from the basic shape, which is designed as a cone mount, and continuously taper the hydrodynamic gap.

As shown in the illustration according to FIG. 5, the contour sections 53.3 and 53.1 form a first and a second bearing area in sectional view. In sectional view, the two bearing areas form a linear section. The linear section of the first bearing area (contour section 53.3) is preferably parallel to the axis of rotation R. The linear section of the second bearing area (contour section 53.1) forms an angle with the axis of rotation R. In that case, the linear section of the second bearing area forms an angle $\alpha$ in the range of preferably >45° to <75°, preferably >50° to <60° and in this exemplary embodiment equal to 55° with the axis of rotation R.

The counterfaces of the counter-bearing part 50 are preferably formed identically with respect to the contour sections 53.1, 53.3, 53.3 and may be provided at the opposite ends of the counter-bearing part 50.

Figure 6:
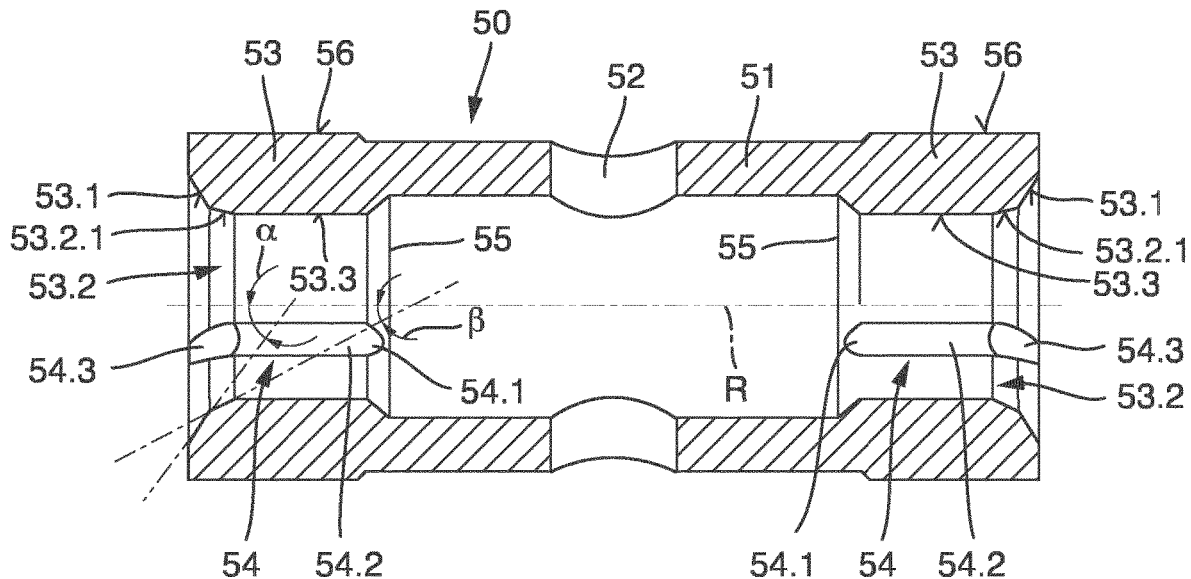

FIG. 6 shows an embodiment of a counter-bearing part 50 alternative to FIGS. 4 and 5. The design of this counter-bearing part 50 according to FIG. 6 corresponds essentially to the design of the counter-bearing part 50 according to FIGS. 4 and 5. The differences are therefore discussed below, and in all other respects reference is made to the above remarks.

As FIG. 6 shows, the counter-bearing part again has two lugs 53, each of which forms a counterface of the hydrodynamic plain bearing. The counterfaces again have contour sections 53.1 to 53.3. The contour section 53.3 has an identical design to that of the contour section 53.1 according to FIG. 5. The contour section 53.2 forms a transition section between the contour section 53.3 and a cone-shaped contour section 53.1. The contour section 53.1 has a substantially identical structure to the contour section 53.1 shown in FIGS. 4 and 5. However, it has a shorter extension in the direction of the rotation axis R. The opening angle $\alpha$ of the contour section 53.1 again corresponds to the opening angle $\alpha$ of the contour section 53.1 according to FIGS. 4 and 5.

In this exemplary embodiment, the contour section 53.2 forming the transition section is formed by a linear transition section 53.2.1, in sectional view through the axis of rotation R. There, the linear transition section 53.2.1 extends at an angle $\beta$ to the axis of rotation R. The linear transition section 53.2.1 can adjoin both the contour sections 53.1 and 53.3 via circumferential kinks, wherein the circumferential kinks are interrupted in the area of the oil feed grooves 54.

It is also conceivable that the linear transition section 53.2.1 adjoins the contour sections 53.1, 53.3 via roundings. In particular, the counterface can also be designed as a bearing contour that can be continuously differentiated at least once.

Figure 7:
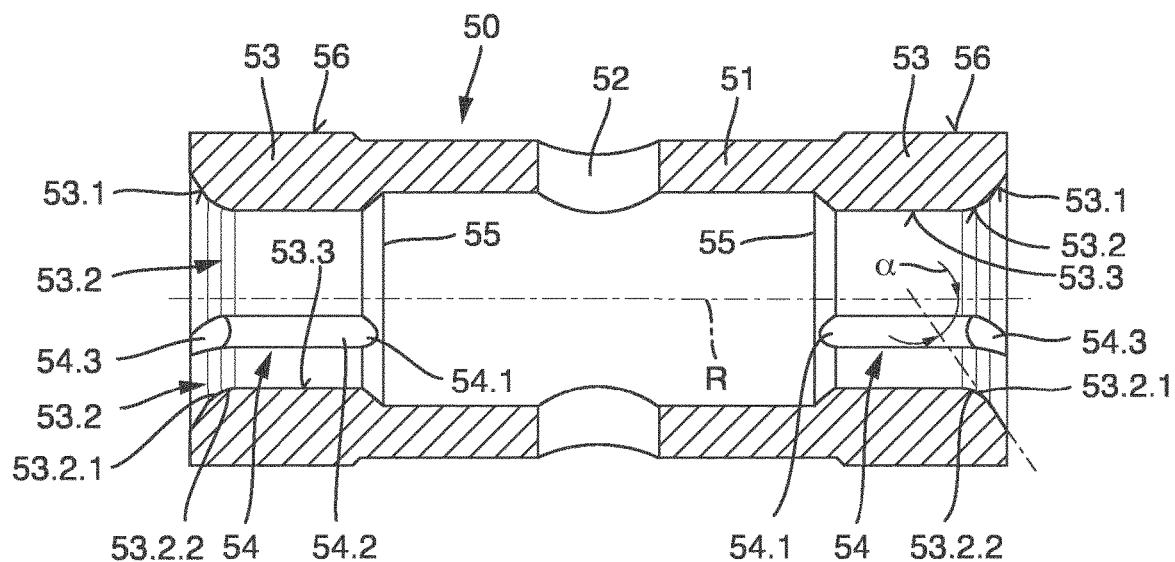

FIG. 7 shows an embodiment of a counter-bearing part 50 alternative to FIGS. 4 to 6. The design of this counter-bearing part 50 according to FIG. 7 corresponds essentially to the design of the counter-bearing part 50 according to FIGS. 4 to 6. The differences are therefore discussed below, and in all other respects reference is made to the above remarks.

As FIG. 7 shows, the counter-bearing part again has two lugs 53, each of which forms a counterface of the hydrodynamic plain bearing. The counterfaces again have contour sections 53.1 to 53.3. The contour section 53.3 has an identical design to that of the contour section 53.1 according to FIGS. 4 to 6.

The contour section 53.2 forms a transition section between the contour section 53.3 and a cone-shaped contour section 53.1. The contour section 53.1 has a substantially identical structure to the contour section 53.1 shown in FIGS. 4 and 5. However, it has a shorter extension in the direction of the rotation axis R. The opening angle $\alpha$ of the contour section 53.1 again corresponds to the opening angle $\alpha$ of the contour section 53.1 according to FIGS. 4 and 5.

In this exemplary embodiment, the contour section 53.2 forming the transition section is formed by two linear transition sections 53.2.1 and 53.2.2, in sectional view through the axis of rotation R. There, the linear transition section 53.2.1 extends at an angle $\beta$ to the axis of rotation R. The linear transition section 53.2.2 forms an angle $\gamma$ with the axis of rotation R. In so doing, the allocation is made such that the angle $\beta$ is smaller than the angle $\gamma$. The linear transition section 53.2.1 can adjoin the contour section 53.1 via a circumferential kink, wherein the circumferential kink is interrupted in the area of the oil feed grooves 54. The linear transition section 53.2.2 can adjoin the contour section 53.3 via a circumferential kink, wherein the circumferential kink is interrupted in the area of the oil feed grooves 54. The linear transition sections 53.2.1 and 53.2.2 merge into each other via a running kink, wherein the circumferential kink is interrupted in the area of the oil feed grooves 54. It is also conceivable that the linear transition sections 53.2.1, 53.2.2 adjoin the contour sections 53.1, 53.3 via roundings instead of at least one of the kinks. Preferably, all kinks are designed as roundings. In particular, the counterface can also be designed as a bearing contour that can be continuously differentiated at least once.

The above explanations in relation to FIGS. 4 to 7 describe the embodiment of the counter-bearing part 50. The bearing sections 17, 44 of the rotor 10 are designed to complement these counter-bearing parts 50. Corresponding to the contour sections 53.1 to 53.3 of the counter-bearing part 50, the bearing sections 17 and 44 have the contour sections 17.1 to 17.3 and 44.1 to 44.3. These contour sections 17.1 to 17.3 and 44.1 to 44.3 are complementary to the contour sections 53.1 to 53.3. The contour sections 17.1 to 17.3 are identical to the contour sections 44.1 to 44.3. Reference is therefore made below to FIG. 8. In this drawing, the bearing section 17 is shown in more detail. In the explanations below, the same explanations also apply to the bearing section 44.

Figure 8:
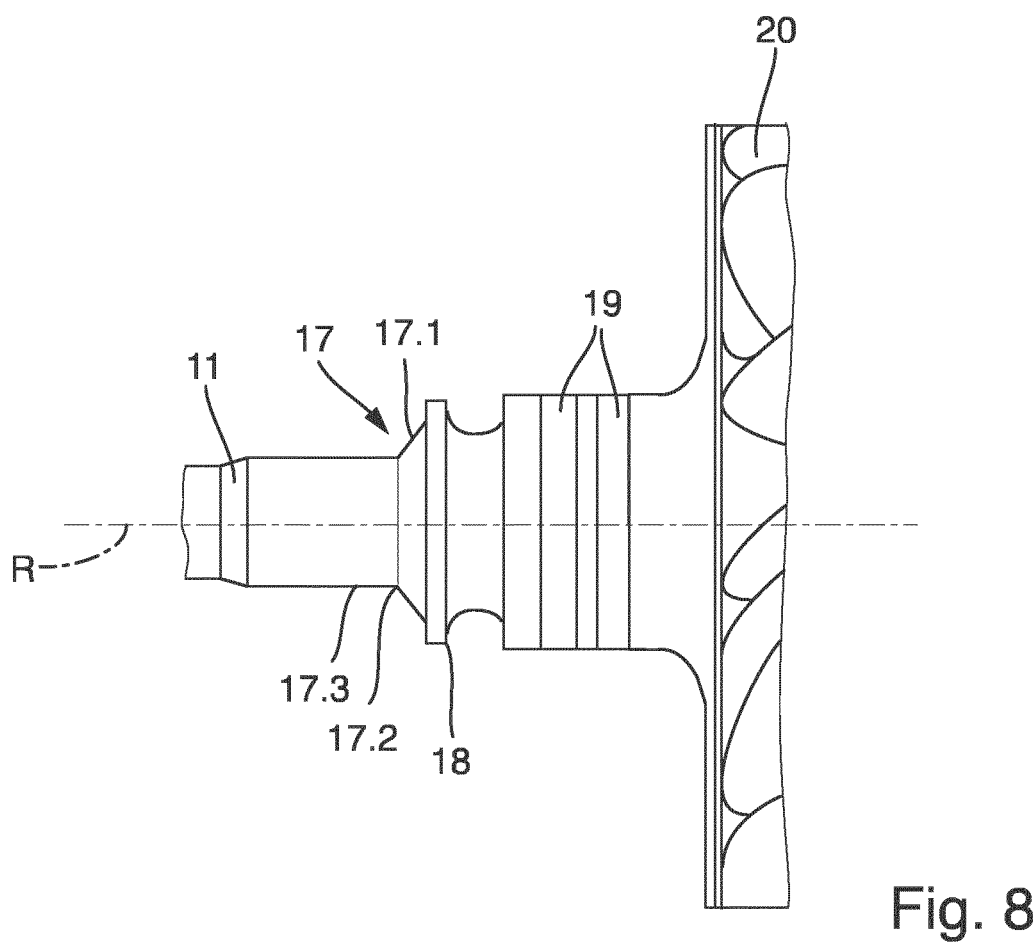

The bearing section 17 according to FIG. 8 is used to be mounted in the counter-bearing part 50 according to FIGS.

Figure 9:
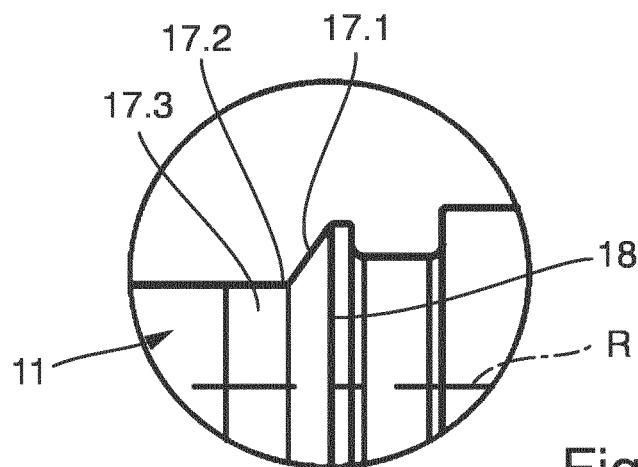

4 and 5. The bearing section 17 has three contour sections 17.1, 17.2 and 17.3. In sectional view through the axis of rotation R, the contour section 17.3 has a linear section which extends in parallel to the axis of rotation R. In sectional view through the axis of rotation R, the bearing section 17.1 has a linear section which is set at an angle to the axis of rotation R, wherein this angle corresponds to the setting angle α of the contour section 53.1. The two contour sections 17.1 and 17.3 are merged via the transition section 17.2, which is designed as a circumferential kink. This is illustrated more clearly in the enlarged representation shown in FIG. 9.

Figure 10:
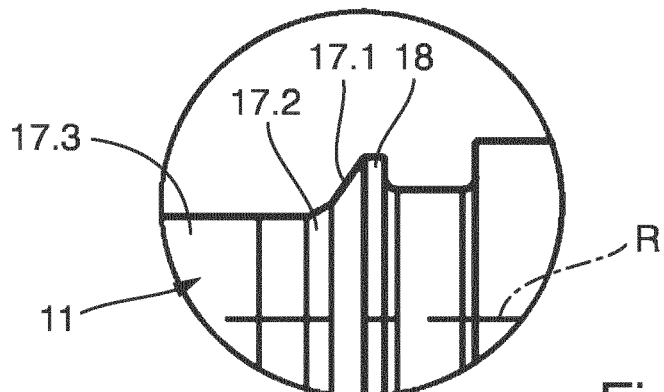

FIG. 10 shows an enlarged view of the rotor shaft 11, which matches the counter-bearing part 50 according to FIG. 6. In sectional view through the axis of rotation R, the contour section 17.3 has a linear section which extends in parallel to the axis of rotation R. In sectional view through the axis of rotation R, the bearing section 17.1 has a linear section which is set at an angle to the axis of rotation R, wherein this angle corresponds to the setting angle α of the contour section 53.1. It is also conceivable that deviating angles or a crowning in the form of a very large radius are provided to prevent the bearing contours from going solid in the area of the contour section 17.1 The two contour sections 17.1 and 17.3 are merged via the transition section 17.2. The transition section 17.2 is designed as a linear transition section in sectional view through the axis of rotation; the transition section interconnects the two contour sections 17.1, 17.3. The linear transition section can connect to the contour sections 17.1, 17.3 via circumferential kinks or roundings.

Figure 11:
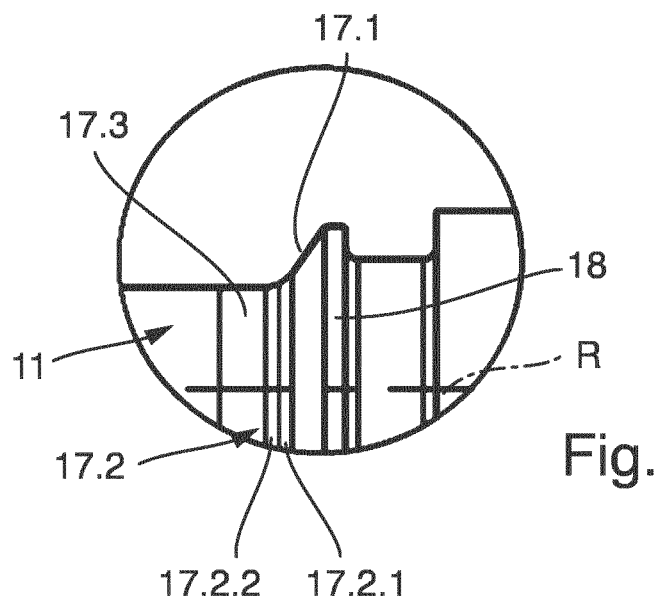

FIG. 11 shows an enlarged view of the rotor shaft 11, which matches the counter-bearing part 50 according to FIG. 7. In sectional view through the axis of rotation R, the contour section 17.3 has a linear section which extends in parallel to the axis of rotation R. In sectional view through the axis of rotation R, the bearing section 17.1 has a linear section which is set at an angle to the axis of rotation R, wherein this angle corresponds to the setting angle α of the contour section 53.1. It is also conceivable that deviating angles are provided to prevent the bearing contours from going solid in the area of the contour section 17.1. The two contour sections 17.1 and 17.3 are merged via the transition section 17.2. In sectional view through the axis of rotation, the transition section 17.2 has two linear transition sections 17.2.1, 17.2.2. The linear transition section 17.2.1 connects the contour section 17.1 to the linear transition section 17.2.2. The linear transition section 17.2.2 connects the contour section 17.3 to the linear transition section 17.2.1. The two linear transition sections 17.2.1, 17.2.2 are interconnected. The joints between the contour sections 17.1 and 17.3 and the linear transition sections 17.1.1, 17.2.2 can be designed as circumferential kinks or as roundings. The connection between the linear transition sections 17.2.1, 17.2.2 can be a circumferential kink or a rounding.

With reference to the exemplary embodiments described above, it has been explained that the lubrication keys and the oil feed grooves 54 may be implemented on the counter-bearing part 50. Of course, it is also conceivable that the lubrication keys and the oil feed grooves 54 are also used on the rotor 11. It is further conceivable that, for example, one of these two structures is implemented on the rotor 11 and the other structure is implemented on the counter-bearing part 50. For instance, the oil feed grooves may be located on the counter-bearing part 50 and the lubrication keys may be located on the rotor 11, or conversely, the oil feed grooves 54 may be located on the rotor 11 and the lubrication keys may be located on the counter-bearing part 50.

The invention claimed is:

1. An exhaust gas turbocharger having a hydrodynamic plain bearing, comprising:
    a rotor including a rotor bearing surface, the rotor having an axis of rotation;
    a counter-bearing part including a counterface, wherein the rotor bearing surface of the rotor and the counterface of the counter-bearing part face each other to form the hydrodynamic plain bearing in the form of a combined journal-thrust bearing having a continuous hydrodynamically load bearing gap formed between the rotor bearing surface and the counterface;
    wherein each of the rotor bearing surface and the counterface, when viewed in longitudinal section through the axis of rotation, forms a bearing contour including at least two merging contour sections, the bearing contour being configured to generate hydrodynamic load capacities in both a radial direction and an axial direction; and
    wherein a first contour section of the at least two contour sections in sectional view forms a linear section of a cylindrical or partially cylindrical first bearing area;
    wherein a further contour section of the at least two contour sections in sectional view in a second bearing area forms a further linear section forming an angle in a range of from greater than 30 degrees to less than 90 degrees with the axis of rotation;
    wherein the first contour section and the further contour section merge via a transition section; and
    wherein the rotor bearing surface and/or the counterface has at least one lubrication wedge configured to continuously taper the load bearing gap, the at least one lubrication wedge extending at least partially over both the first and second bearing areas and also across the transition section.

2. The exhaust gas turbocharger having a hydrodynamic plain bearing of claim 1, wherein:
    in a direction of rotation of the hydrodynamic plain bearing the at least one lubrication wedge merges indirectly or directly into a resting surface extending in an arcuate shape in a circumferential direction.

3. The exhaust gas turbocharger having a hydrodynamic plain bearing of claim 1, wherein:
    the rotor bearing surface and the counterface in an area of the transition section are configured such that at maximum deflection of the rotor the rotor bearing surface and the counterface rest against each other such that a line contact is established.

4. The exhaust gas turbocharger having a hydrodynamic plain bearing of claim 1, wherein:
    the angle formed by the further linear section with the axis of rotation is in a range of from greater than 45 degrees to less than 75 degrees.

5. The exhaust gas turbocharger having a hydrodynamic plain bearing of claim 1, wherein:
    the angle formed by the further linear section with the axis of rotation is in a range of from greater than 50 degrees to less than 60 degrees.

6. The exhaust gas turbocharger having a hydrodynamic plain bearing of claim 1, wherein:
    the transition section includes at least one curved transition section.

7. The exhaust gas turbocharger having a hydrodynamic plain bearing of claim 1, wherein:

the transition section includes at least a first and a second linear transition section, the first linear transition section being closer to the first bearing area than is the second linear transition section.

8. The exhaust gas turbocharger having a hydrodynamic plain bearing of claim 7, wherein:
the first linear transition section forms a smaller angle with the axis of rotation than does the second linear transition section.

9. The exhaust gas turbocharger having a hydrodynamic plain bearing of claim 1, wherein:
the transition section includes at least two curved transition sections with different curvature contours.

10. The exhaust gas turbocharger having a hydrodynamic plain bearing of claim 1, wherein:
the transition section includes at least one linear transition section adjoined on each side by a curved transition section.

11. The exhaust gas turbocharger having a hydrodynamic plain bearing of claim 1, wherein:
the bearing contour of the rotor bearing surface and/or the counterface is a continuous and continuously differentiable bearing contour configured to generate hydrodynamic load capacity across the entire bearing contour.

12. The exhaust gas turbocharger having a hydrodynamic plain bearing of claim 1, wherein:
the transition section adjoins the first and or the second bearing area via a discontinuity extending in a circumferential direction.

13. The exhaust gas turbocharger having a hydrodynamic plain bearing of claim 1, wherein:
the first contour section and the further contour section are interconnected within the transition section by a discontinuity extending in a circumferential direction.

14. The exhaust gas turbocharger having a hydrodynamic plain bearing of claim 1, wherein:
the first contour section of the first bearing area and the further contour section of the second bearing area merge indirectly or directly in the transition section via a rounded area.

15. The exhaust gas turbocharger having a hydrodynamic plain bearing of claim 1, wherein:
the rotor bearing surface and/or the counterface includes at least one oil feed groove extending in a direction of the axis of rotation at least partially across the first and second bearing areas and across the transition section.

16. The exhaust gas turbocharger having a hydrodynamic plain bearing of claim 1, wherein:
the rotor bearing surface and/or the counterface includes at least one oil feed groove extending around the axis of rotation in a helical manner with a pitch angle in a range of plus or minus 20 degrees to the axis of rotation, and the at least one oil feed groove extends at least partially across the first and second bearing areas and across the transition section.

17. The exhaust gas turbocharger having a hydrodynamic plain bearing of claim 1, wherein:
the rotor includes a rotor shaft and a rotor part, the rotor shaft including a support section supporting the rotor part, the rotor bearing surface being formed on the rotor part; and
the support section and at least one of the contour sections of the counterface of the counter-bearing part overlap in the direction of the axis of rotation, at least sectionally.

18. The exhaust gas turbocharger having a hydrodynamic plain bearing of claim 17, further comprising:
a bearing housing or a housing part, the counter-bearing part being mounted in the bearing housing or housing part such that a circumferential gap area for forming a trapped oil film is formed between an outer contour of the counter-bearing part and the bearing housing or the housing part, wherein the circumferential gap area is spatially connected to a lubricant guide channel, and wherein the circumferential gap area and the support section at least sectionally overlap in the direction of the axis of rotation.

19. The exhaust gas turbocharger having a hydrodynamic plain bearing of claim 18, wherein:
a radial clearance between the counter-bearing part and the bearing housing or the housing part is greater than a radial clearance between the rotor part and the counter-bearing part.

20. The exhaust gas turbocharger having a hydrodynamic plain bearing of claim 18, wherein:
a relative radial clearance between the counter-bearing part and the bearing housing or the housing part is in a range from 5 to 10 per mil with reference to an outer diameter of the circumferential gap area.

21. The exhaust gas turbocharger having a hydrodynamic plain bearing of claim 18, wherein:
a relative radial clearance between the counter-bearing part and the bearing housing or the housing part is in a range from 7 to 9 per mil with reference to an outer diameter of the circumferential gap area.

22. The exhaust gas turbocharger having a hydrodynamic plain bearing of claim 18, wherein:
an axial overlap in the direction of the axis of rotation between the counter-bearing part and the bearing housing or the housing part in the circumferential gap area for the formation of the trapped oil film is dimensioned such that a ratio of an extension of the circumferential gap area in the direction of the axis of rotation to a radial clearance between the counter-bearing part and the bearing housing or the housing part is in a range of from 40 to 80.

23. The exhaust gas turbocharger having a hydrodynamic plain bearing of claim 22, wherein:
the ratio of the extension of the circumferential gap area in the direction of the axis of rotation to the radial clearance between the counter-bearing part and the bearing housing or the housing part is in a range from 45 to 70.

24. The exhaust gas turbocharger having a hydrodynamic plain bearing of claim 18, wherein:
a radial clearance between the counter-bearing part and the bearing housing or the housing part in the circumferential gap area and an axial extension of the circumferential gap area are defined by the relation:
the axial extension of the circumferential gap area in millimeters equals 9 minus C times the radial clearance in millimeters, where C is in a range from 61 to 75.

25. The exhaust gas turbocharger having a hydrodynamic plain bearing of claim 24, wherein:
C is in a range from 66 to 70.

26. An exhaust gas turbocharger having a hydrodynamic plain bearing, comprising:
a rotor including a rotor bearing surface, the rotor having an axis of rotation;
a counter-bearing part including a counterface, wherein the rotor bearing surface of the rotor and the counterface of the counter-bearing part face each other to form the hydrodynamic plain bearing in the form of a combined journal-thrust bearing having a continuous hydrodynamically load bearing gap formed between the rotor bearing surface and the counterface;

wherein each of the rotor bearing surface and the counterface, when viewed in longitudinal section through the axis of rotation, forms a bearing contour including at least two merging contour sections, the bearing contour being configured to generate hydrodynamic load capacities in both a radial direction and an axial direction; and wherein a first contour section of the at least two contour sections in sectional view forms a linear section of a cylindrical or partially cylindrical first bearing area;

wherein a further contour section of the at least two contour sections in sectional view in a second bearing area forms a further linear section forming an angle in a range of from greater than 30 degrees to less than 90 degrees with the axis of rotation;

wherein the first contour section and the further contour section merge via a transition section; and wherein the transition section includes at least one linear transition section.

27. An exhaust gas turbocharger having a hydrodynamic plain bearing, comprising:

a rotor including a rotor bearing surface, the rotor having an axis of rotation;

a counter-bearing part including a counterface, wherein the rotor bearing surface of the rotor and the counterface of the counter-bearing part face each other to form the hydrodynamic plain bearing in the form of a combined journal-thrust bearing having a continuous hydrodynamically load bearing gap formed between the rotor bearing surface and the counterface;

wherein each of the rotor bearing surface and the counterface, when viewed in longitudinal section through the axis of rotation, forms a bearing contour including at least two merging contour sections, the bearing contour being configured to generate hydrodynamic load capacities in both a radial direction and an axial direction; and wherein a first contour section of the at least two contour sections in sectional view forms a linear section of a cylindrical or partially cylindrical first bearing area;

wherein a further contour section of the at least two contour sections in sectional view in a second bearing area forms a further linear section forming an angle in a range of from greater than 30 degrees to less than 90 degrees with the axis of rotation;

wherein the first contour section and the further contour section merge via a transition section;

wherein the first contour section of the first bearing area and the further contour section of the second bearing area merge indirectly or directly in the transition section via a rounded area; and wherein the rounded area has a radius in a range of from 0.3 mm to 1.5 mm.

28. The exhaust gas turbocharger having a hydrodynamic plain bearing of claim 27, wherein:

the rounded area has a radius in a range of from 5% to 25% of a mean diameter of the transition section.

* * * * *